United States Patent [19]
Tanaka et al.

[11] Patent Number: 6,147,948
[45] Date of Patent: Nov. 14, 2000

[54] DISK LOADING DEVICE FOR DISK PLAYER

[75] Inventors: Shinsaku Tanaka; Kunio Kido, both of Tokyo, Japan

[73] Assignee: Tanashin Denki Co., Ltd., Tokyo, Japan

[21] Appl. No.: 09/178,577

[22] Filed: Oct. 26, 1998

[51] Int. Cl.[7] .................................................. G11B 17/04
[52] U.S. Cl. ............................................................ 369/77.1
[58] Field of Search .............................. 369/77.1, 75.2, 369/204; 360/99.06, 99.02

[56] References Cited

U.S. PATENT DOCUMENTS

| | | | |
|---|---|---|---|
| 4,969,140 | 11/1990 | Koiwa et al. | 369/77.1 |
| 5,163,040 | 11/1992 | Hake | 369/204 |
| 5,173,894 | 12/1992 | Kido | 369/77.1 |
| 5,416,763 | 5/1995 | Ohsaki | 369/77.1 |

FOREIGN PATENT DOCUMENTS

| | | |
|---|---|---|
| 63-23261 | 1/1988 | Japan. |
| 63-26861 | 2/1988 | Japan. |
| 63-37853 | 2/1988 | Japan. |
| 11-86401 | 3/1999 | Japan. |

*Primary Examiner*—William R. Korzuch
*Assistant Examiner*—Julie Anne Watko
*Attorney, Agent, or Firm*—Dickinson Wright PLLC

[57] ABSTRACT

The invention concerns a disk loading device for a disk player, which permits accurate positioning of a disk at a playback position, as well as being small in size and simple in construction. In the device, an inserted disk pushes a first lever and, when the first lever has been rocked beyond a dead point related to a lever biasing means, the first lever is rocked by the elastic force of the lever biasing means. At this time, a second lever follows the first lever, and the disk is pushed forth up to and positioned at a playback position by the two levers. In this state, a drive means is started to cause a clamper to be lowered and hold the disk on a turntable. Subsequently, the two levers are retreated from the disk.

6 Claims, 14 Drawing Sheets

DISK LOADING DEVICE FOR DISK PLAYER

BACKGROUND OF THE INVENTION

1. Field of the Invention

This invention relates to a disk loading device for disk player, which is small in size and simple in construction.

2. Description of the Prior Art

A disk player has a disk loading device, which performs a series of operations from transferring a disk to a playback position till completion of the playback preparations with the disk clamped between a turntable and a clamper.

A prior art disk loading device is disclosed in, for instance, Japanese Patent Disclosure No. 63-23261. The disclosed disk loading device comprises a rockably reciprocable arm and a biasing spring held in contact with pins provided at the opposite ends of the arm. When the arm is rocked in either forward or reverse direction, it receives resistance offered by the spring until it reaches a dead point, but as soon as the dead point is exceeded it is quickly brought to the end position by the elastic force of the spring.

When inserting a disk, the edge thereof pushes one of the pins until the arm exceeds the dead point. Subsequently the other pin pushes the disk up to the playback position. When taking out the disk, the arm is rocked in the reverse direction until it exceeds the dead point. Subsequently, the other pin pushes back the disk.

Disk transfer operation is performed in relation to the upward and downward movements of a chuck member (clamp) so that the chuck member moves downward when the disk is transferred to the playback position thereby to clamp the disk in association with the turntable.

The disk loading device disclosed in the Japanese Patent Disclosure No. 63-23261, however, has a drawback that it is difficult to accurately position the disk, which is clamped between the two pins on the rockably reciprocable arm, at the playback position. This is so because it is necessary to set the distance between the two pins to be greater than the distance permitting the clamping of the disk for it is necessary that the pins be held spaced apart form the disk during playback.

Unless the disk is accurately positioned at the playback position, the disk can not be clamped between the turntable and a chuck (i.e., clamper). Besides, in this case the chuck may cause damage to the recording area of the disk when it is lowered.

An object of the present invention, accordingly, is to provide a disk loading device for a disk player, which can accurately position a disk at the playback position for reliably clamping of the disk between the turntable and the clamper and eliminate the possibility of damage to the disk, as well as being small in size and simple in construction.

SUMMARY OF THE INVENTION

In the disk loading device according to the present invention, a disk is loaded with its edge or outer periphery pushed by a first lever, which is found at a disk waiting position at this time. The first lever is reciprocally rockable between the disk waiting position and a retreated position slightly rearwardly spaced apart from the disk at the playback position. A second lever is disposed on the same side of the disk loading path as the first lever. When the first lever is at the disk waiting position, the second lever is held in a zone that it permits loading of a disk.

On the side of the disk loading path opposite the first and second levers, a disk guide is provided, which defines a disk transport orbit. The second lever is usually biased in a disk pushing-in direction by lever biasing means. The lever biasing means biases the first lever in opposite directions on the opposite sides of an intermediate rocking position of the first lever.

When the first lever is pushed from the disk waiting position by the edge or outer periphery of a disk against the elastic force of the lever biasing means, the second lever cooperates with the first lever to transport the disk in such a state that the disk is clamped from the front and rear sides thereof by the two levers. When the disk is positioned on a turntable, a drive means including a motor as a drive source is started, and operates a timing mechanism.

The timing mechanism is normally prohibiting the descent of a clamper and also prohibiting the rocking movement of the first lever toward the retreated position. When the drive means is started, the timing mechanism is operated such that it first releases the clamper and then releases the first lever.

When the first lever is released by the timing mechanism and rocked toward the retreated position, the second lever is pulled apart from the disk by separating means.

With the construction as described, when a disk is inserted from a disk loading slot and pushed in by the first lever, reverse operation of the lever biasing means is caused, the second lever is cooperated with the first lever to position the disk on the turntable such that the disk is clamped between the two levers. Subsequently, the clamper is lowered and clamps the disk on the turntable. Then, the first and second levers are separated or retreated from the disk.

Accurate positioning of a disk on the turntable is thus obtainable with a simple construction and without possibility of causing damage to the disk. In addition, it is possible to reduce the size of the disk loading device. It is thus possible to provide a disk loading device which is best suited for automotive disk players.

The first lever may be adapted, when it is rocked by being pushed by a small-size disk inserted from the disk loading slot, to be continuously biased toward the disk waiting position by the lever biasing means until the disk is fully inserted inside the disk loading slot. With this arrangement, even when the small-size disk is inserted by mistake until it is fully concealed inside the disk loading slot, its release will cause the first lever to push it back. It is thus possible to eliminate the possibility that the small-size disk inserted by mistake can no longer be taken out.

The second lever may be adapted, when the first lever is at the disk waiting position, to be at an initial position set in a zone on the disk loading path, for loading the disk while the second lever is pushed away by the edge of the disk. With this arrangement, the disk having been brought into contact with the second lever, eventually comes to a position that it turns to be pushed forward by the second lever. Thus, a sense that the disk is withdrawn can be obtained, and it is possible to obtain improved mood of operating mood of the disk loading.

The first lever may also be adapted, when its rocking movement is prohibited by the timing mechanism in the loading of a disk, to start the motor of the drive means. This arrangement permits accurately setting the timing of starting operation of the timing mechanism.

By constructing the lever biasing means with a single spring, the number of components can be reduced, and the overall construction can be further simplified.

By setting the rocking support positions of the first and second levers to be within the contour of the disk at the playback position, it is possible to reduce the planar size and thus obtain further size reduction of the disk player.

BRIEF DESCRIPTION OF THE DRAWINGS

The above and other objects, features and advantages of the present invention will become more apparent upon reading of the following detailed specification with reference to drawings, in which.

DETAILED DESCRIPTION OF THE PREFERRED EMBODIMENT

Figure 1:
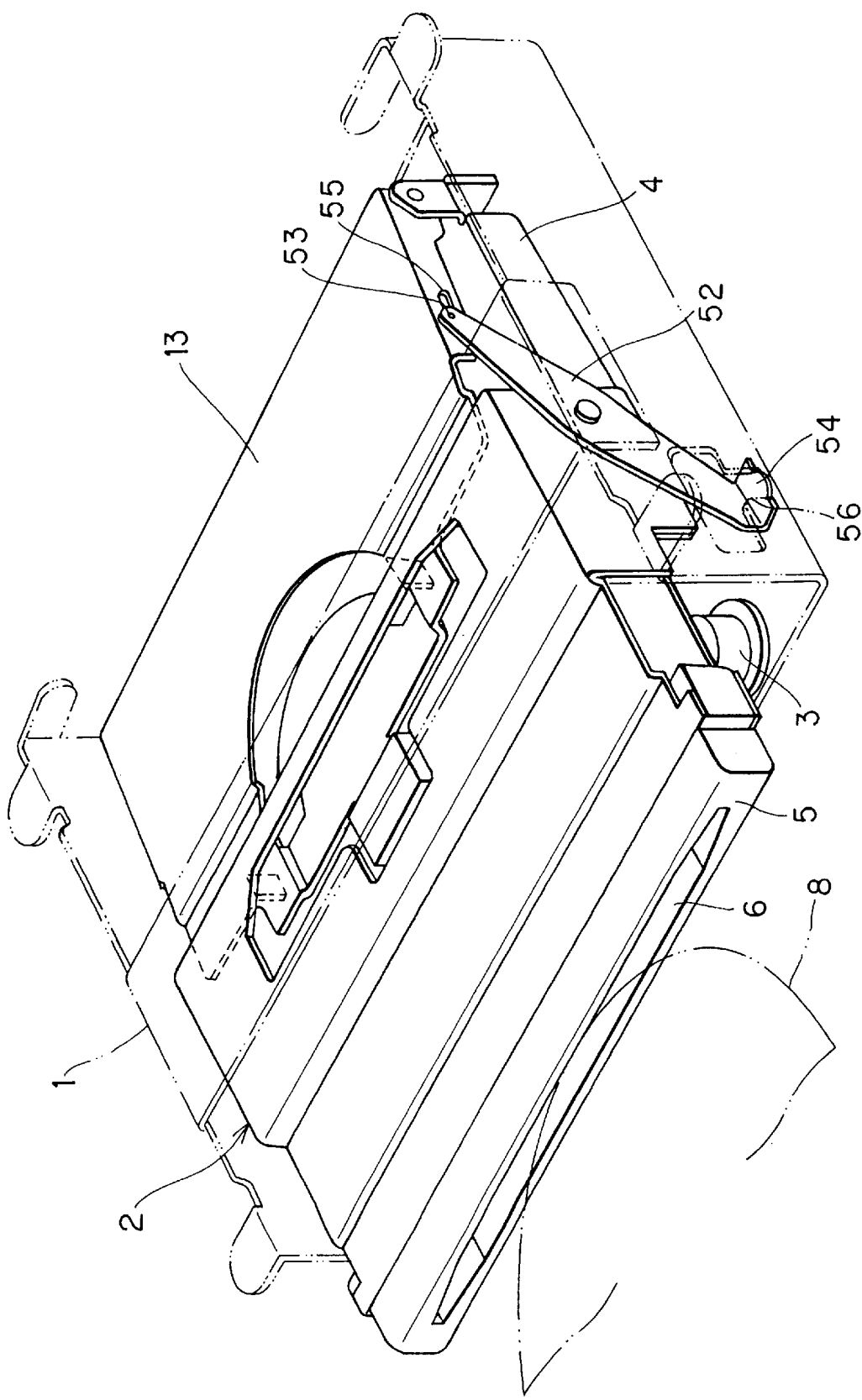
FIG. 1 is a schematic perspective view showing an embodiment of the invention.
Figure 2:
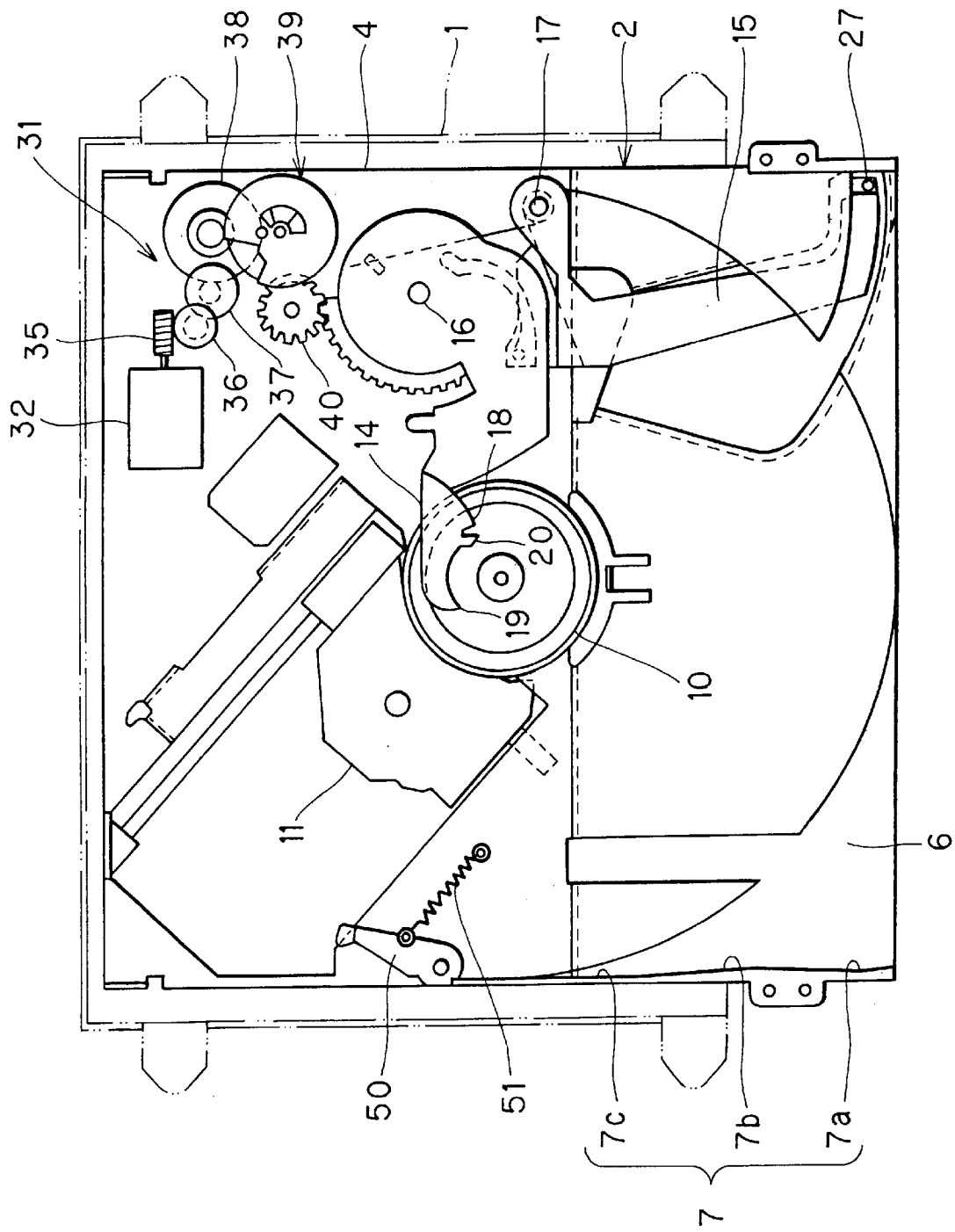
FIG. 2 is a plan view showing the internal construction of a playing unit.
Figure 3:
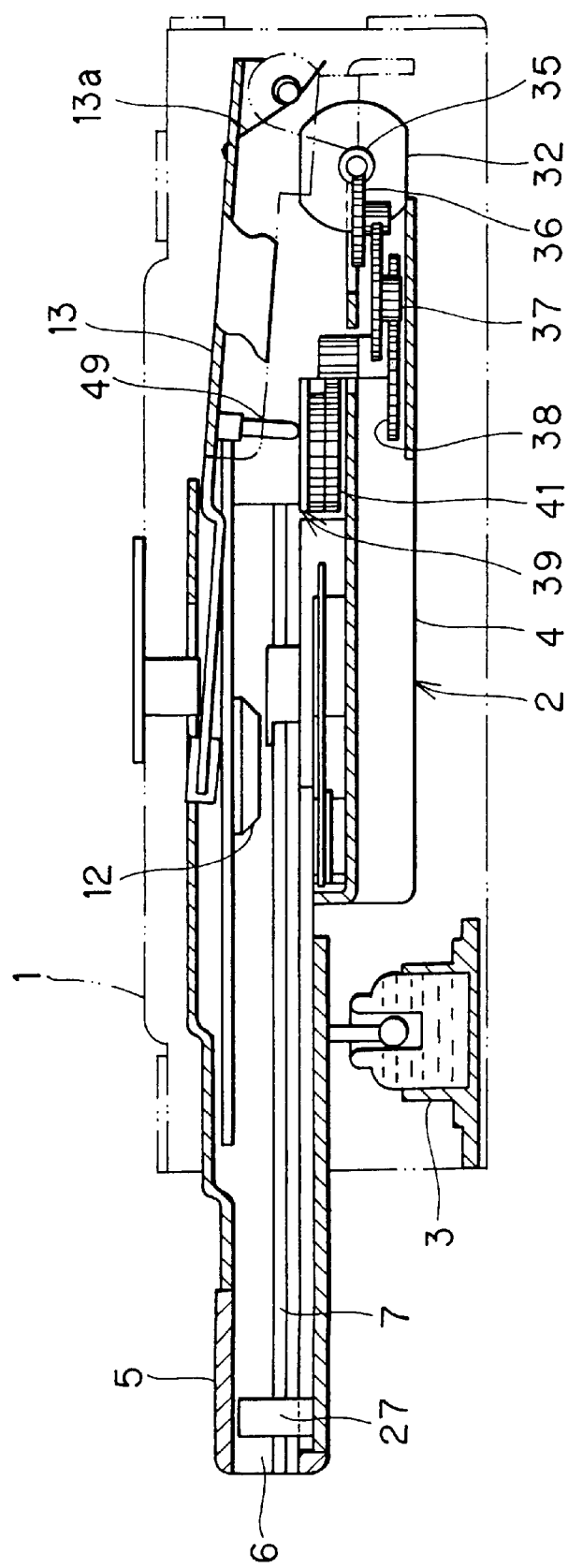
FIG. 3 is a sectional view showing the internal construction of the playing unit viewed from the right side.
Figure 4:
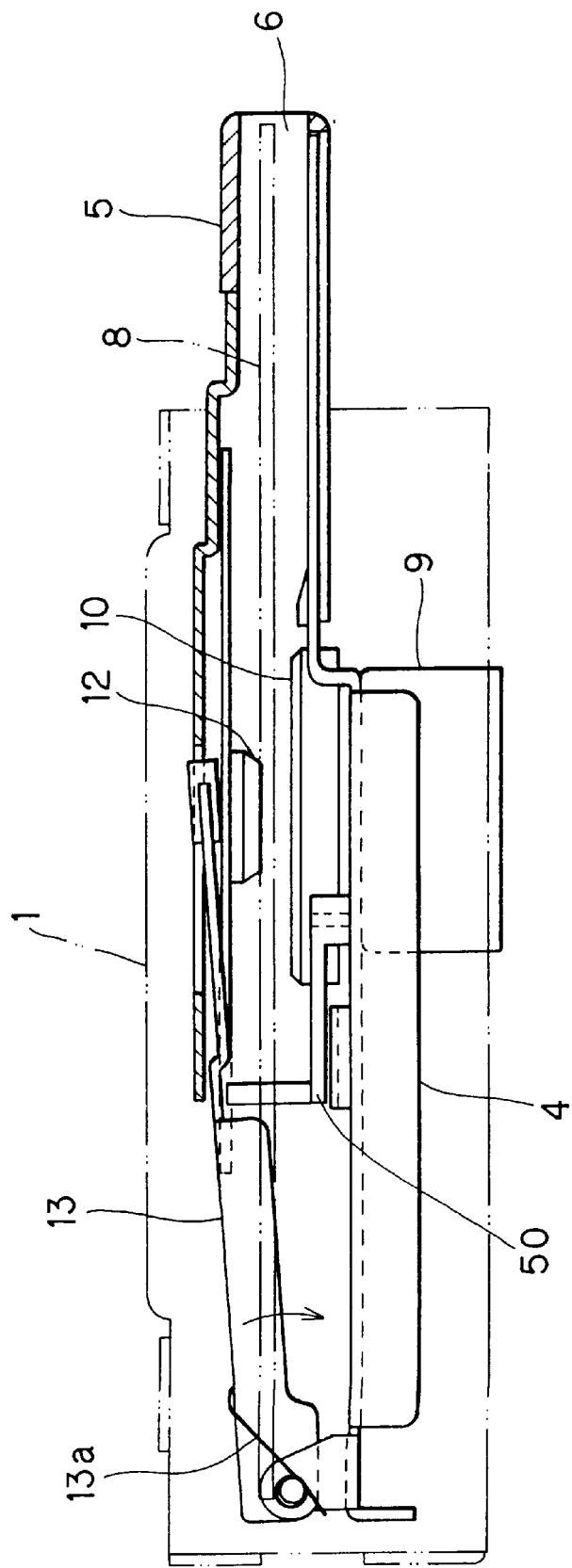
FIG. 4 is a sectional view showing the internal construction of the playing unit viewed form the left side.

FIG. 1 is a schematic perspective view showing a mechanical part of the automotive disk player. FIG. 2 is a plan view showing the internal construction of a playing unit 2. FIG. 3 is a sectional view showing the internal construction of the unit 2 viewed from the right side. FIG. 4 is a sectional view showing the unit 2 viewed from the left.

In a player body 1 which is formed from a metal sheet, the playing unit is mounted via a damper 3. The playing unit 2 has a chassis 4 formed from a metal sheet. The chassis 4 supports a synthetic resin block 5 secured to its front end. The block 5 has a disc loading slot 6, and also has an integral disk guide 7(see FIG. 2) extending from the left end of the disk loading slot 6 into the player body 1. The edge of a disk 8 which is inserted into the disk loading slot 6 is brought into contact with the disk guide 7, which thus sets a disk transport orbit.

As shown in FIG. 2, the disk guide 7 has a slightly recess-shaped first contact part 7a formed adjacent to its inlet end, a slanted second contact part 7b rearwardly adjacent thereto and a third contact part 7c rearwardly adjacent to the second contact part 7b. The third contact part 7c is formed parallel to disk transport orbit. The chassis 4 also supports a turntable drive motor 9 secured to its underside. The shaft of the motor 9 has a turntable 10 directly coupled thereto above the chassis 4 (see FIG. 4). The chassis 4 further supports a pick-up 11 mounted on it horizontally reciprocably (see FIG. 2), for reading out data recorded in the disk 8.

The chassis 4 further supports a clamper support 13 mounted on it and supporting a clamper 12. The clamper support 13 is rockably mounted in vertical directions, and is biased downward by a clamper spring 13a as clamper biasing means (see FIGS. 3 and 4). The clamper 12 has its axis aligned to the axis of the turntable 10, and brought into contact with and separated from the turntable 10 with rocking movement of the clamper support 13 in vertical directions.

The chassis 4 further supports a first and a second lever 14 and 15 rotatably or rockably mounted on it in a horizontal plane via pins or shafts 16 and 17, respectively (see FIG. 2).

The first lever 14 has its mounted end portion formed with a large-disk contact part 18 to be in contact with the edge or outer periphery of a 12-cm disk 8, a small-size disk contact part 19 to be in contact with the edge or outer periphery of an 8-cm small-size disk d (see FIG. 5) and an anti-floating part 20 for preventing the floating of disk 8.

FIGS. 6 to 9 are plan views showing the disk player in an initial stage of disk loading, in an intermediate stage of disk loading, in a state with disk 8 positioned at playback position and in a state when the preparations for the playback operation have been completed (same as the state in the playback operation), respectively.

The large-size disk contact part 18 can be displaced in a zone on the right side of the orbit of the center of disk 8 transferred along the disk guide 7. The first lever is rockable between a disk waiting position (shown in FIG. 6) near the disk loading slot 6 and a retreated position (shown in FIG. 9) slightly rearward of the disk 8 at the playback position.

Figure 6:
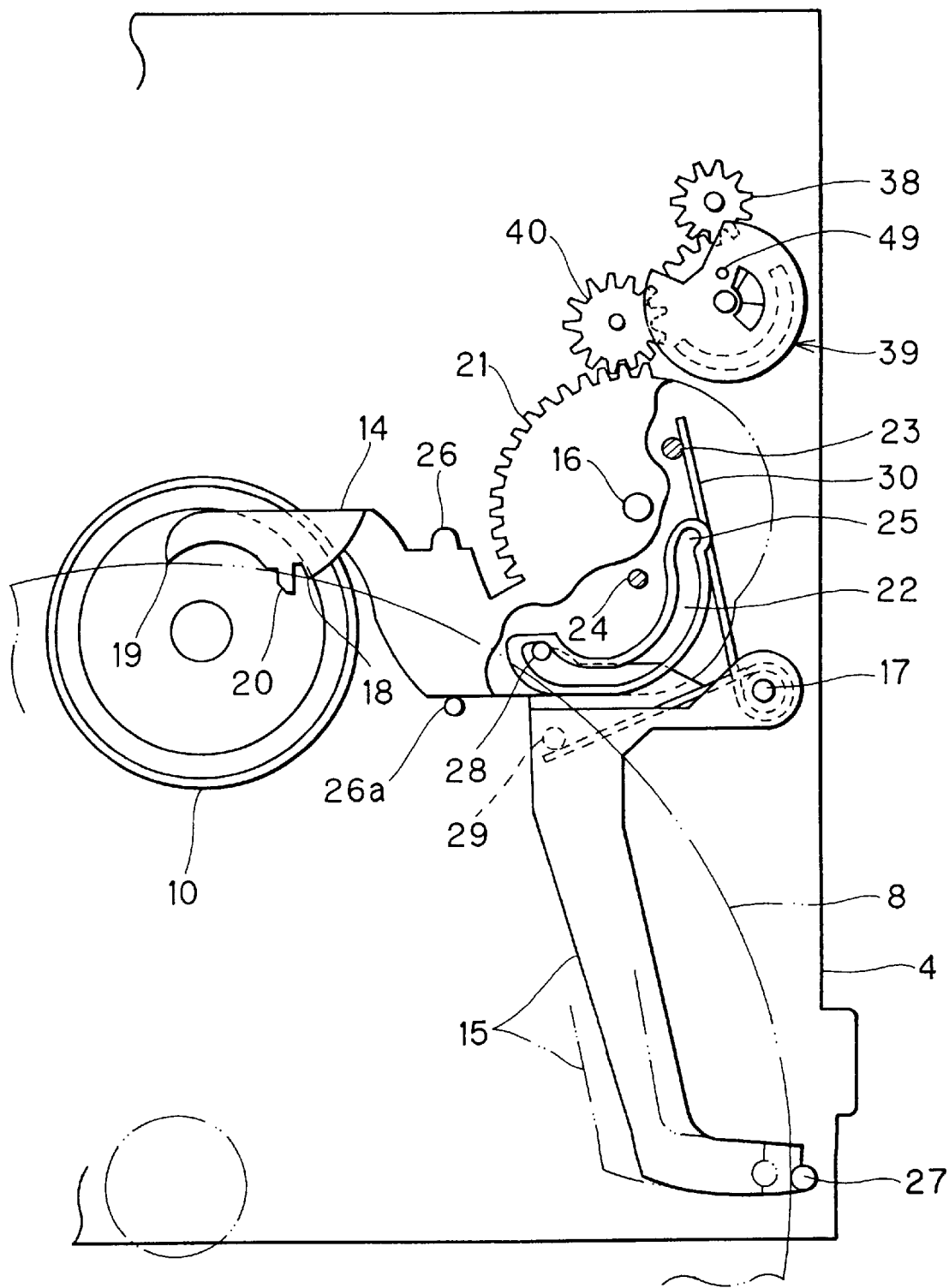
FIG. 6 is a plan view showing the relation between the first and second lever.

With the first lever 14 at the disk waiting position as shown in FIG. 6, the edge of the disk 8, inserted until the center thereof slightly clears the disk loading slot 6, is brought into contact with the large-size disk contact part 18. The disk 8 in this position projects from the disk loading slot 6 by nearly one half, and thus can be readily taken out at any time.

The first lever 14 has a sector gear 21 concentric with the pin 16, and its lower part has a spiral cam groove 22, a spring anchor pin 23 and a switch operating pin 24. The distance of the cam groove 22 from its rocking center is progressively reduced as one goes in the counterclockwise direction to a minimum distance, and is then slightly increased therefrom in the neighborhood of its end. The increasing distance portion serves as a separating part 25 as separating means. The first lever 14 further has a contact portion 26. Designated at 26a is a stopper pin which restricts the rotation or the rocking movement of the first lever 14 in the counter-clockwise direction.

The second lever 15 has a disk pushing member 27 formed at its free end and capable of being in contact with the edge of 18-cm disk 8, and also has a cam engagement pin 28 and a spring anchor pin 29, these pins being provided near its rocking center. In its initial position before disk loading, the disk pushing member 27 faces the first contact part 7a of the disk guide 7 from t he right side, as shown by solid line in FIG. 6.

Figure 8:
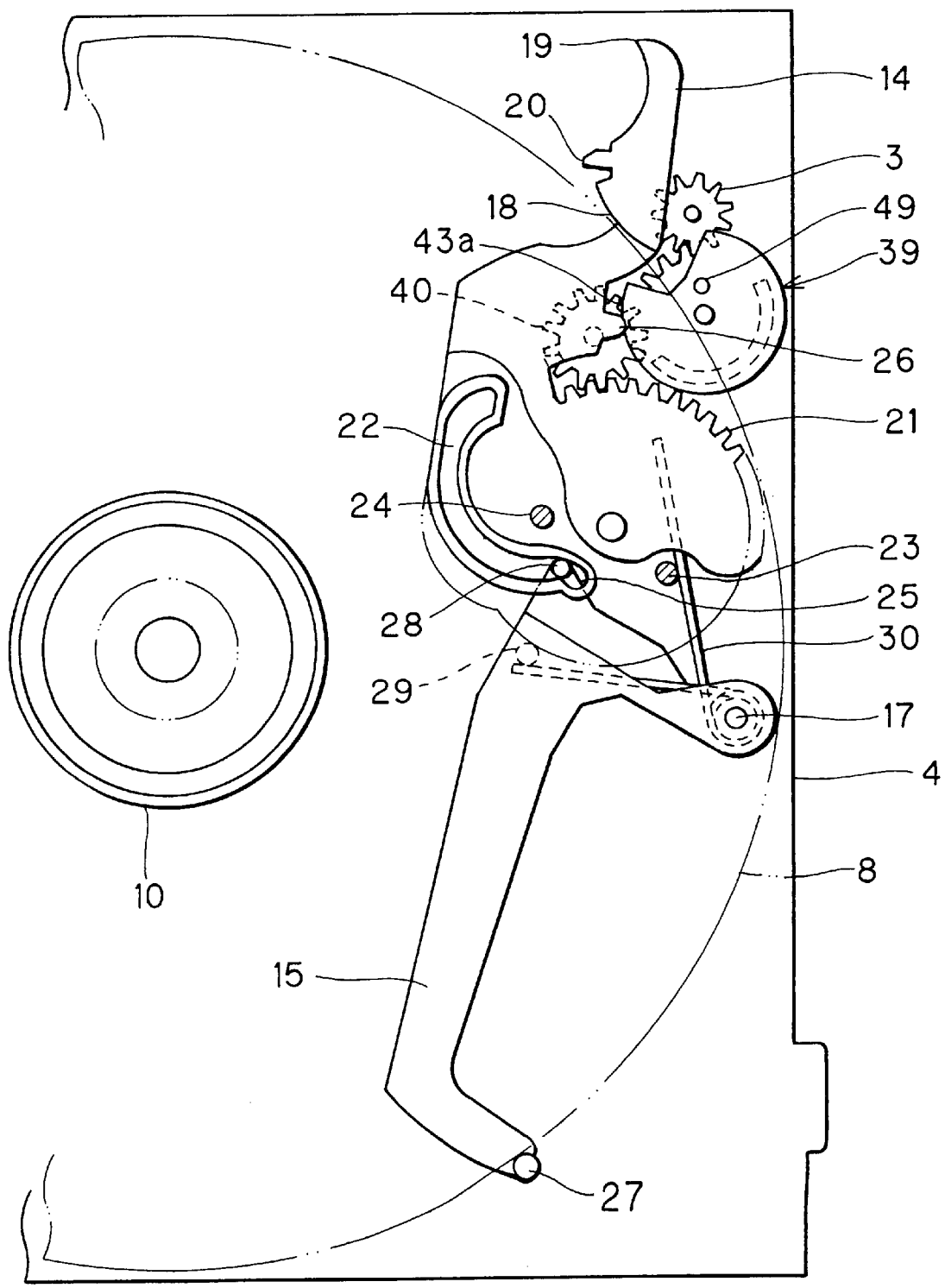
FIG. 8 is a plan view showing the relation between the first and second levers.
Figure 9:
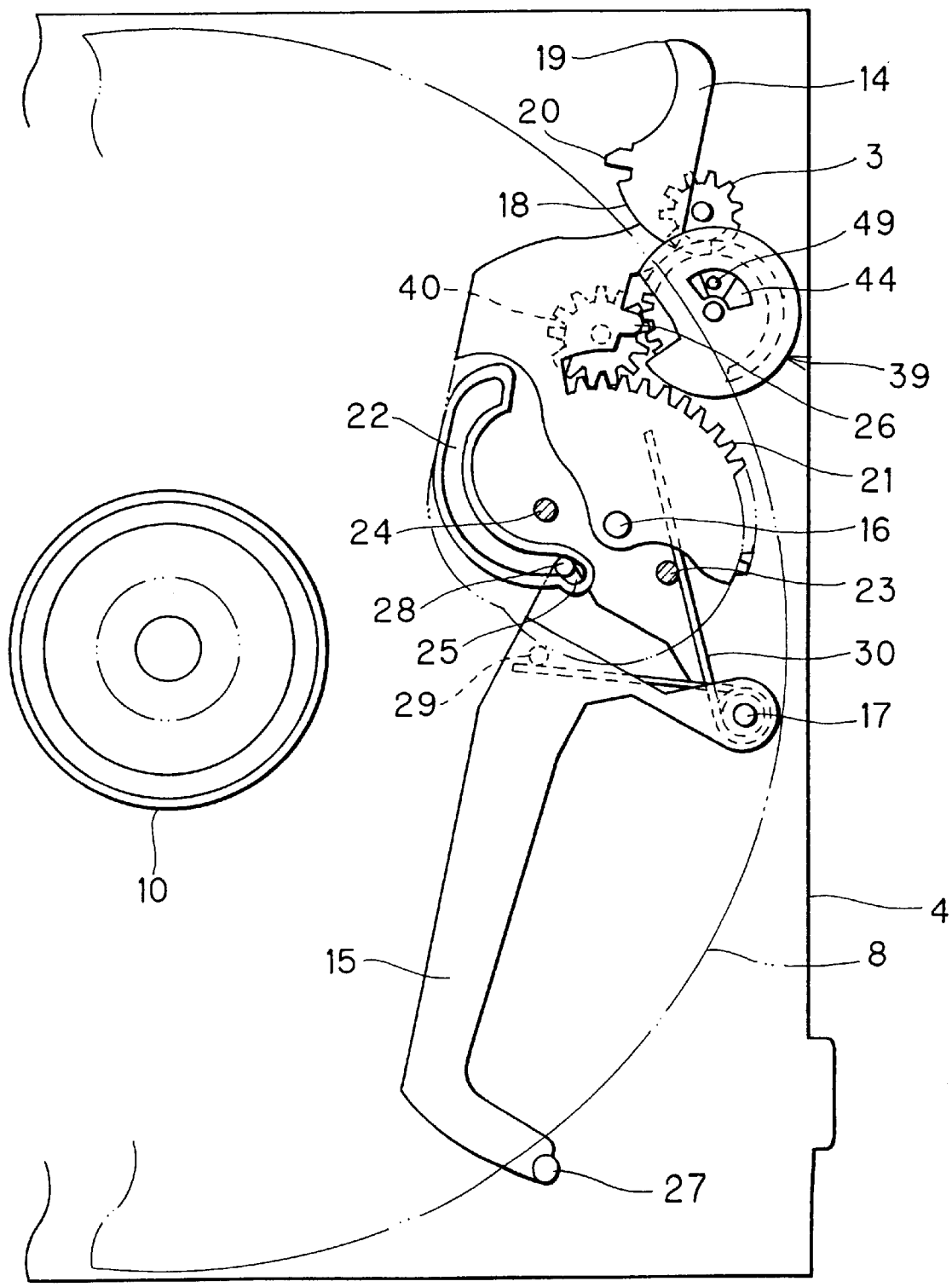
FIG. 9 is a plan view showing the relation between the first and second levers.

The first and second levers 14 and 15 have their rocking centers set within the contour of the disk 8 at the playback position in plan view (see FIGS. 8 and 9).

A lever biasing spring 30 is mounted as lever biasing means on the pin 17 such that it is pushing the cam engagement pin 28 against an inner side wall surface of the cam groove 22 with its opposite end portions in engagement with the spring anchor pins 23 and 29. With the first lever 14 at the disk waiting position as shown in FIG. 6, the disk pushing member 27 of the first lever 15 is initially at a position slightly inside the orbit width defined by the disk 8 as shown by the phantom line in FIG. 6. When the disk 8 inserted from the disk loading slot 6 reaches the first lever, the disk pushing member 27 is at a displaced position as shown by the solid line in FIG. 6.

In FIG. 6, the second lever 15 is shown by the phantom line when it is at the initial position, and by the solid line when it is brought to the most pushed-away position by the disk 8 inserted from the disk loading slot 6. The disk pushing member 27 of the second lever 15 is rockable at least between the most pushed-away position noted above and a pushing position (as shown in FIG. 8) when the disk 8 has been pushed forth up to the playback position.

While in this embodiment the initial position of the disk pushing member 27 is set to be slightly within the orbit depth defined by the disk 8, it is also possible that the disk pushing member 27 is initially outside the orbit width.

Figure 7:
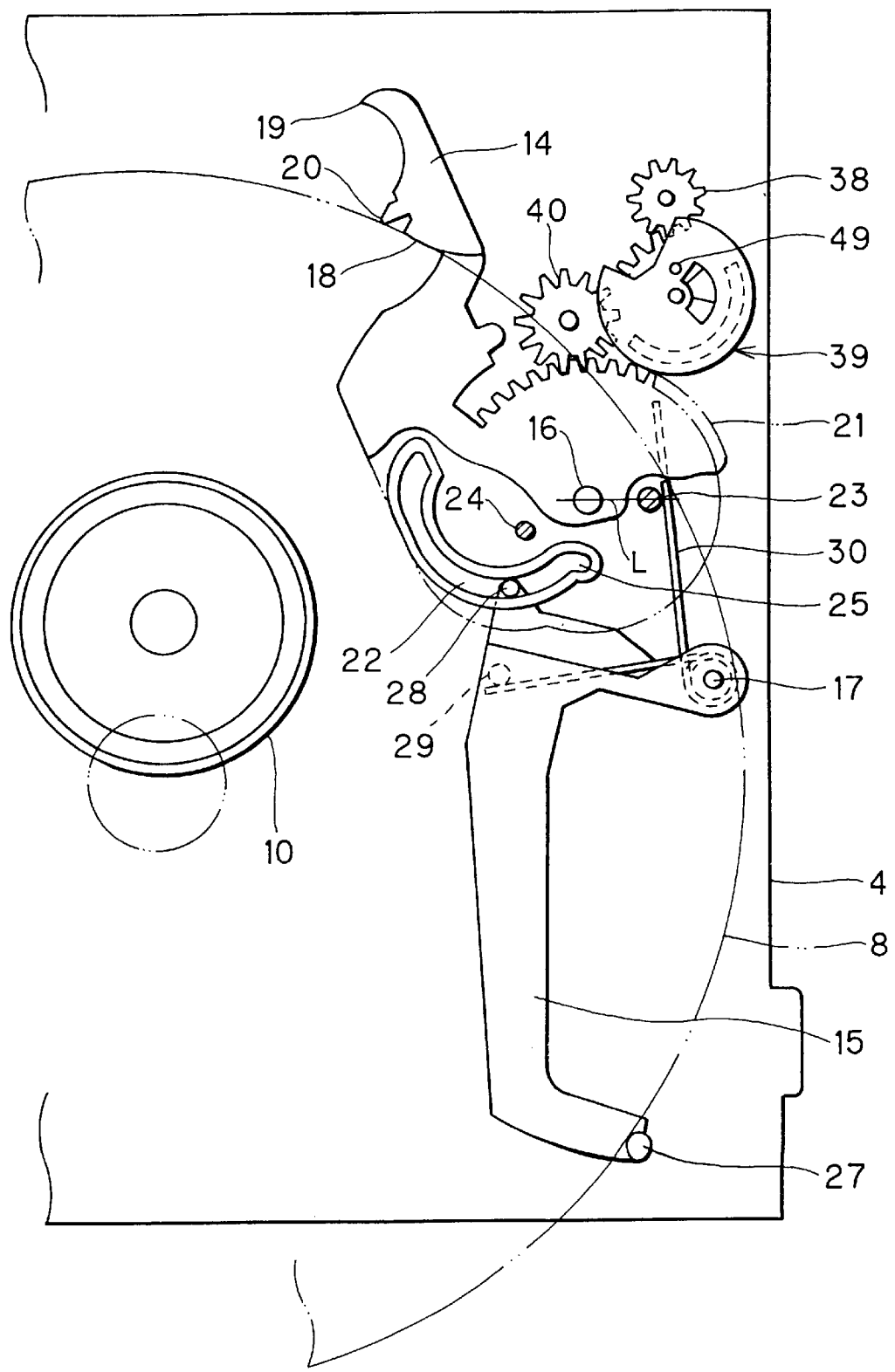
FIG. 7 is a plan view showing the relation between the first and second levers.

The first lever 14 and the lever biasing spring 30 are in the following relation to each other. As shown in FIG. 7, when the first lever 14 is rocked to a position, at which the direction of the center-to-center line L between the spring engagement pin 23 and the pin 16, is aligned to the direction in which the spring anchor pin 23 is pushed by the lever biasing spring 30, this position of the first lever 14 is a "dead point" position in relation to the lever biasing spring 30. At this time, the first lever 14 is biased in neither direction by the lever biasing siring 30.

When the first lever 14 is on the disk waiting position side of the "dead point" position, it is biased toward the disk waiting position by the lever biasing spring 30. When the first lever 14 is on the retreated position side of the "dead point" position, on the other hand, it is biased toward the retreated position.

Figure 5:
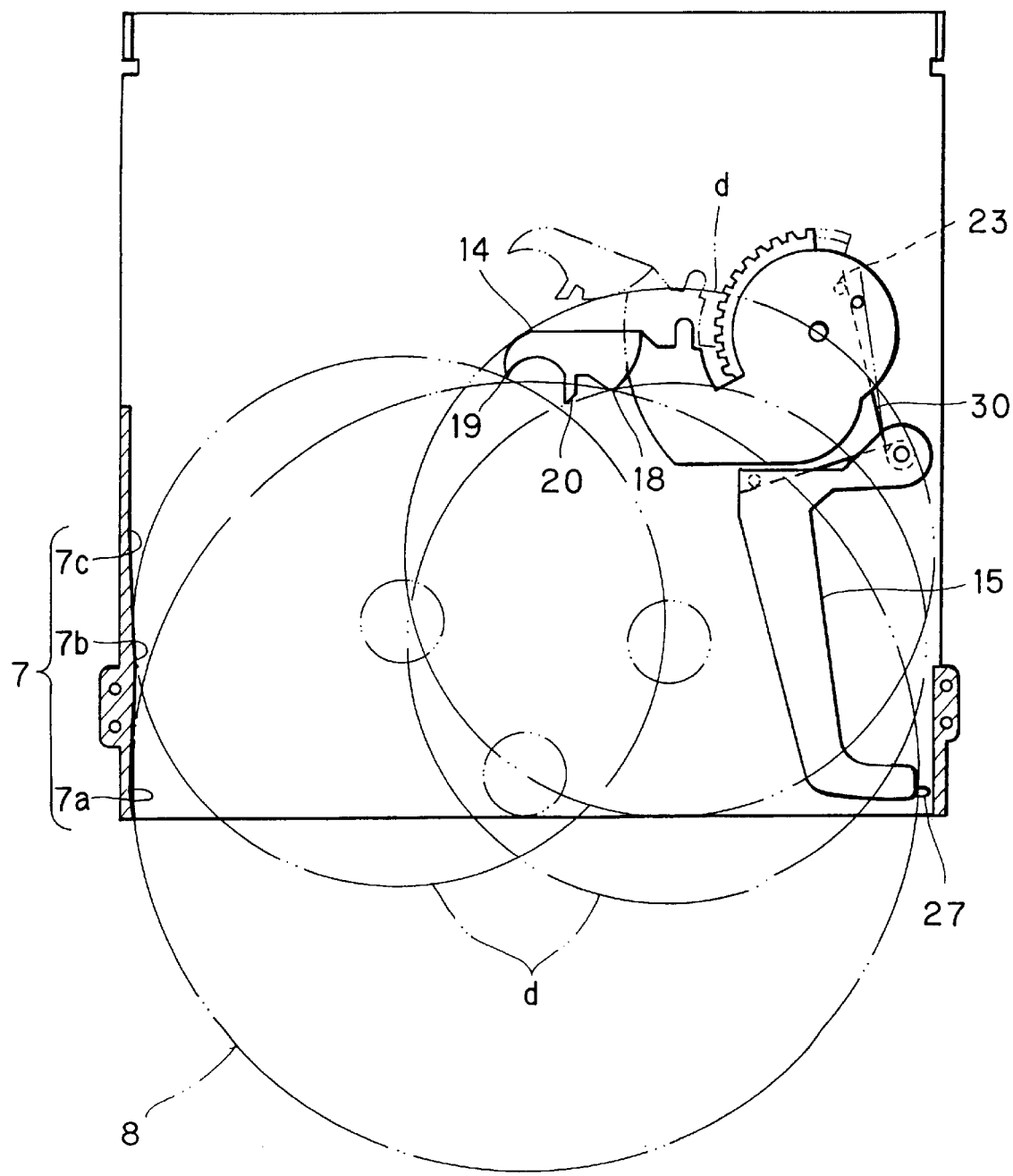
FIG. 5 is a plan view showing the relation between a small-size disk and a first and a second lever.

When the small-size (i.e., 8-cm) disk d is inserted by mistake until it is fully concealed inside the disk loading slot 6 as shown by the phantom line in FIG. 5, the first lever 14 is rocked with its large- or small-size contact part 18 or 19 pushed by the disk d, but not up to the "dead point" position. Thus, releasing the fully inserted disk d causes the disk d to be pushed back by the elastic force of the lever biasing spring 30.

The cam groove 22 and the cam engagement pin 29 are in the following relation to each other.

As shown in FIG. 6, before insertion of the disk 8, the first lever is at the disk waiting position. At this time, the cam engagement pin 28 in the cam groove 22 is at the maximum distance position thereof from the pin 16. When the disk 8 is inserted in this state, it pushes away the disk pushing member 27 to cause slight counterclockwise rocking movement of the second lever 15. The slight counterclockwise rocking movement of the second lever 15 causes slight displacement of the cam engagement pin 28 from the maximum distance position of the cam groove 22 toward the minimum distance position thereof. The edge of the inserted disk 8 pushes the large-size disk contact part 18 and rocks the first lever 14 clockwise, i.e., toward the retreated position, thus causing displacement of the cam engagement pin 28 in the cam groove 22 toward the minimum distance position thereof.

With the displacement of the cam engagement pin 28 toward the minimum distance position, the second lever 15 follows the first lever 14 and is rocked in the clockwise direction by the elastic force of the lever biasing spring 30, and its disk pushing member 27 pushes forth the disk 8. When the cam engagement pin 28 reaches the minimum distance position in the cam groove 22, the disk 8 just reaches the playback position (FIG. 8). While the first lever 14 is further rocked from the position shown in FIG. 8 to the retreated position shown in FIG. 9, the cam engagement pin 28 is displaced from the minimum distance position to the separating portion 25. This displacement of the cam engagement pin 28 causes slight separation of the disk pushing member 27 of the second lever 15 from the edge of the disk 8.

As shown in FIG. 2, the chassis 4 further supports a drive means 31 mounted on its right rear part. The drive means 31 employs as its drive source a uni-directionally rotatable motor 32 for loading and unloading disk (hereinafter referred to as loading motor or merely motor). The loading motor 32 in controlled by a normally closed start switch 33 and an eject switch (not shown) connected thereto. When the first lever 14 is brought from the disk waiting position to the position shown in FIG. 8, the switch operating pin 24 of the first lever 14 turns on the start switch 33, as shown in FIG. 10B, thus starting the loading motor 32.

FIGS. 10A, 10B, 10C and 10D are plan views showing the relation between the position of the first lever 14 and the start switch 33.

As shown in FIG. 2, the loading motor 32 meshes with a worm gear 35, which in turn meshes with a worm wheel 36 in mesh with a train of speed reduction gears 37 and 38. Said loading motor 32, worm gear 35, worm wheel 36, and gears 37 and 38 constitute the drive means 31. The downstream speed reduction gear 38 is normally in engagement with a cam member 39 serving as a timing mechanism. The cam member 39 selectively engages with an intermediate gear 40. The gears 37 and 38 have integral large and small gears.

Figure 11A:
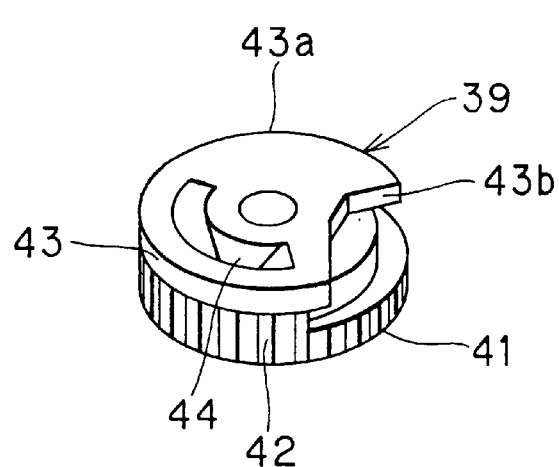
FIGS. 11A and 11B are perspective views showing a cam gear viewed upward and downward, respectively.
Figure 11B:
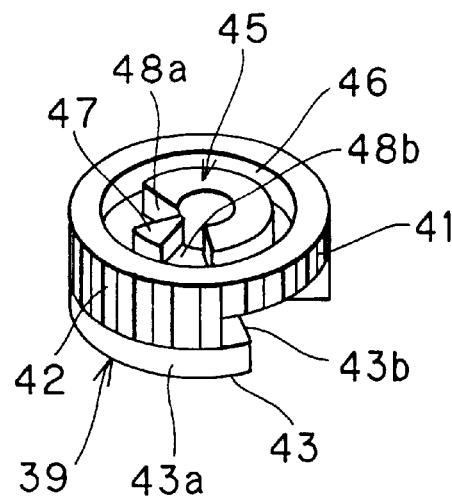

As shown in FIGS. 11A and 11B, the cam member 39 has a lower spur gear 41, an intermediate notched gear 42 and an upper first lever control cam 43. The notched gear 42 has teeth only over a circumference portion subtending about 180 degrees. The first lever control cam 43 has a V-shaped notch 43b formed in a portion of its outer periphery 43a. The cam member 39 has its top surface formed with a clamper control cam 44 in the form of an arcuate recess. As shown in FIG. 11B, the cam member 39 has a switch control cam 45 formed at the bottom. The switch control cam 45 has an arcuate ridge 46 subtending about 240 degrees and a projection 47. A first and a second recess 48a and 48b are defined between the arcuate ridge 46 and the projection 47.

Fabrication of its cam member 39 by using a synthetic resin can be facilitated by forming two separate parts, i.e., one constituting the spur gear 41 and the other constituting the notched gear 42 and the first lever control cam 3, and making these two parts with each other.

As shown in FIGS. 10A to 10D, the intermediate lever 34 is rockably mounted by a pin or shaft 34a on the chassis 4, and has a first arm 34b, a second arm 34c and a third arm 34d radially extending from its rocking center portion respectively. The first arm 34b can selectively engage with the switch operating pin 24 of the first lever 14. The second arm 34c can engage with the switch control cam 45. The third arm 34a can selectively engage with and turn on the start switch 33.

When the first lever 14 is at the disk waiting position as shown in FIG. 6, the free end of the second arm 34c of the intermediate lever 34 is located in the first recess 48a, and the start switch 33 is held "off". When the firs lever 14 being pushed by the disk 8 exceeds the "dead point" position, it is quickly rocked clockwise by the elastic force of the lever biasing spring 30. However, when the first lever 14 comes to a position shown in FIG. 8, at which its contact portion 26 is in contact with the outer periphery 43a of the first lever control cam 43, it is held at that position for a while. At this time, as shown in FIG. 10B, the first arm 34b of the intermediate lever 34 is pushed by the switch operating pin 24 to cause clockwise rocking movement of the intermediate lever 34, and the start switch 33 is thus turned on by the third arm 34d. As a result, the loading motor 32 is started to rotate the cam member 39.

The cam member 39 is rotated at this time in the counterclockwise direction from the position shown in FIG. 10B, causing the free end of the second arm 34c to clear the projection 47 and be received in the second recess 48b. In this operation, the contact portion 26 of the first lever 14 is separated from the outer periphery 43a of the first lever control cam 43 and received in the notch 43b. As a result, the first lever 14 is rocked to the position shown in FIG. 9 by the elastic force of the lever biasing spring 30. In this operation, the switch operating pin 24 is separated from the first arm 34b, thus turning off the switch 33 again as shown in FIG. 10C.

Figure 10A:
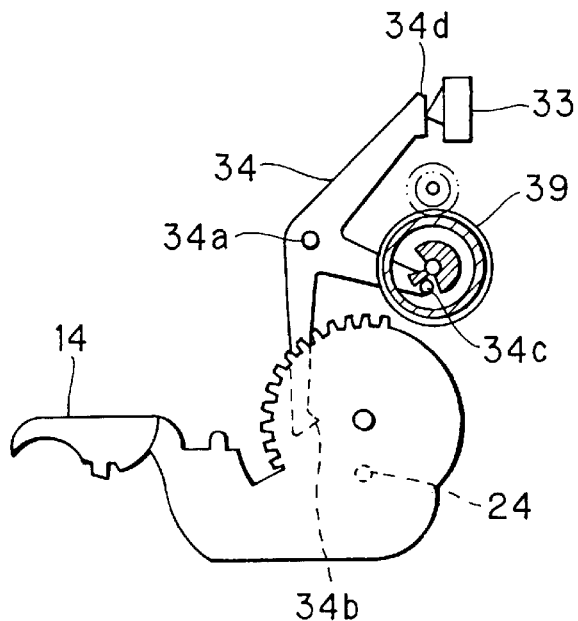
FIGS. 10A, 10B, 10C and 10D are plan views showing the relation between the second lever and a start switch.
Figure 10C:
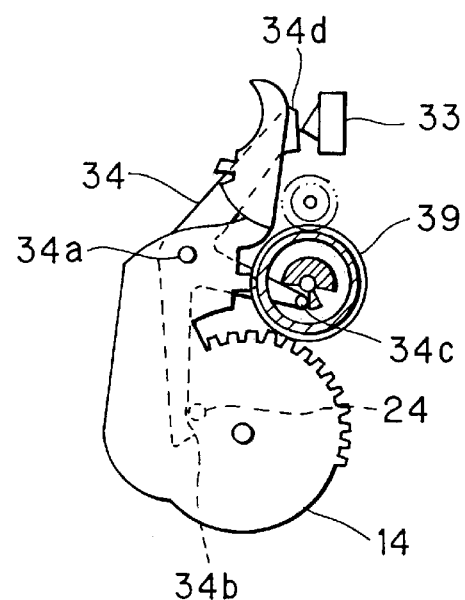
Figure 10B:
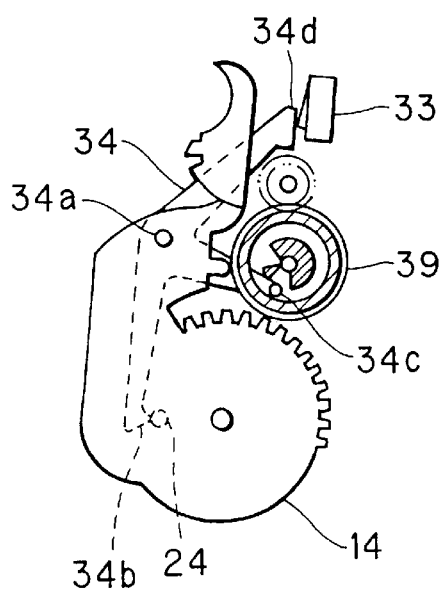
Figure 10D:
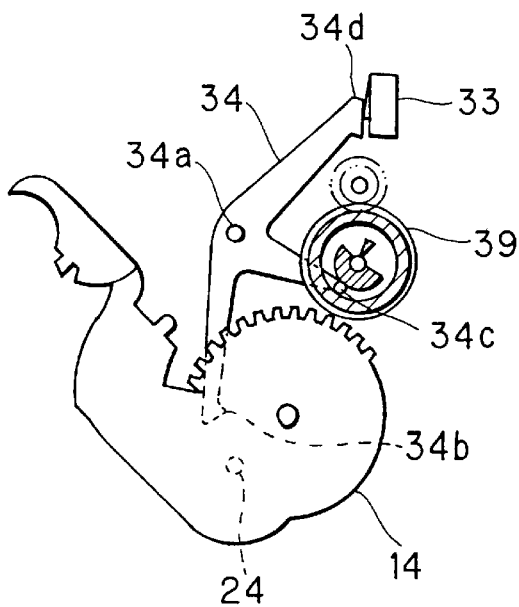

When an eject switch (not shown) is turned on in the state shown in FIG. 10C, the loading motor 32 is started to rotate the cam member 39 in the counterclockwise direction. The counterclockwise rotation of the cam member 39 causes the end of the second arm 34c to ride on the arcuate ridge 46 of the switch control cam 45 and causes clockwise rocking movement of the intermediate lever 34. Thus, the start switch 33 is turned on by the third arm 34d, as shown In FIG. 10D. Subsequently, the eject switch is turned off.

As shown in FIG. 3, the clamper support 13 has a contact pin 49 provided on the underside. The contact pin 49 is biased downward by the clamper spring 13a, and is normally in contact with the top surface of the cam member 39. However, when the contact pin 49 is brought into engagement in the clamper control cam 44 with rotation of the cam member 39, it is gradually lowered in level and causes downward rocking movement of the clamper support 13. As the contact pin 49 gets out of engagement in the clamper control cam 44 to be in contact again with the top surface of the cam member 39, the clamper support 13 is restored upward.

Figure 12:
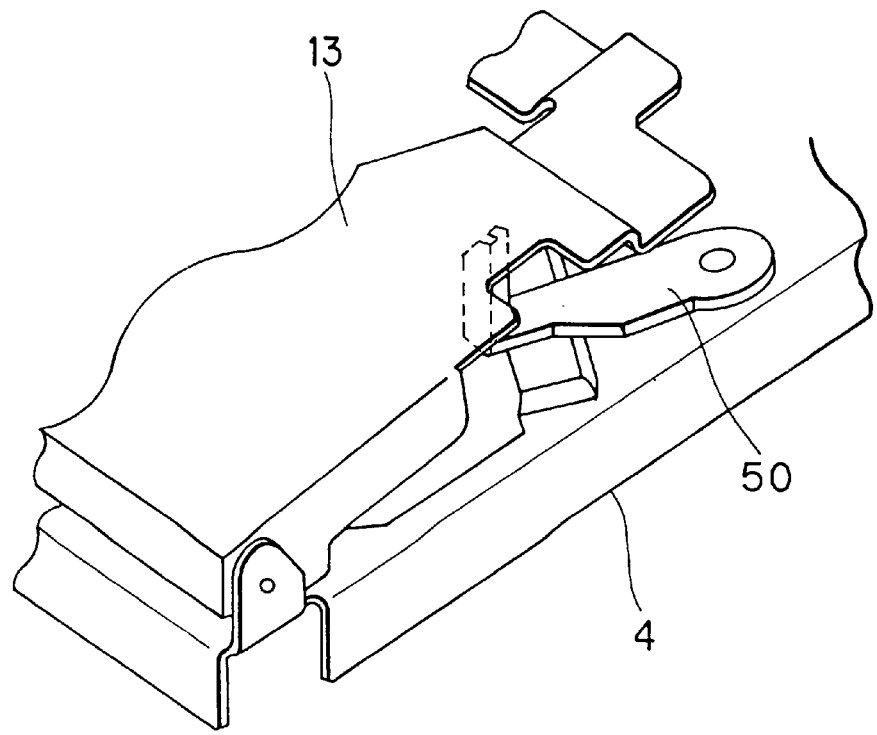
FIG. 12 is a fragmentary perspective view showing the relation between a disk detecting member and a clamper support.
Figure 13:
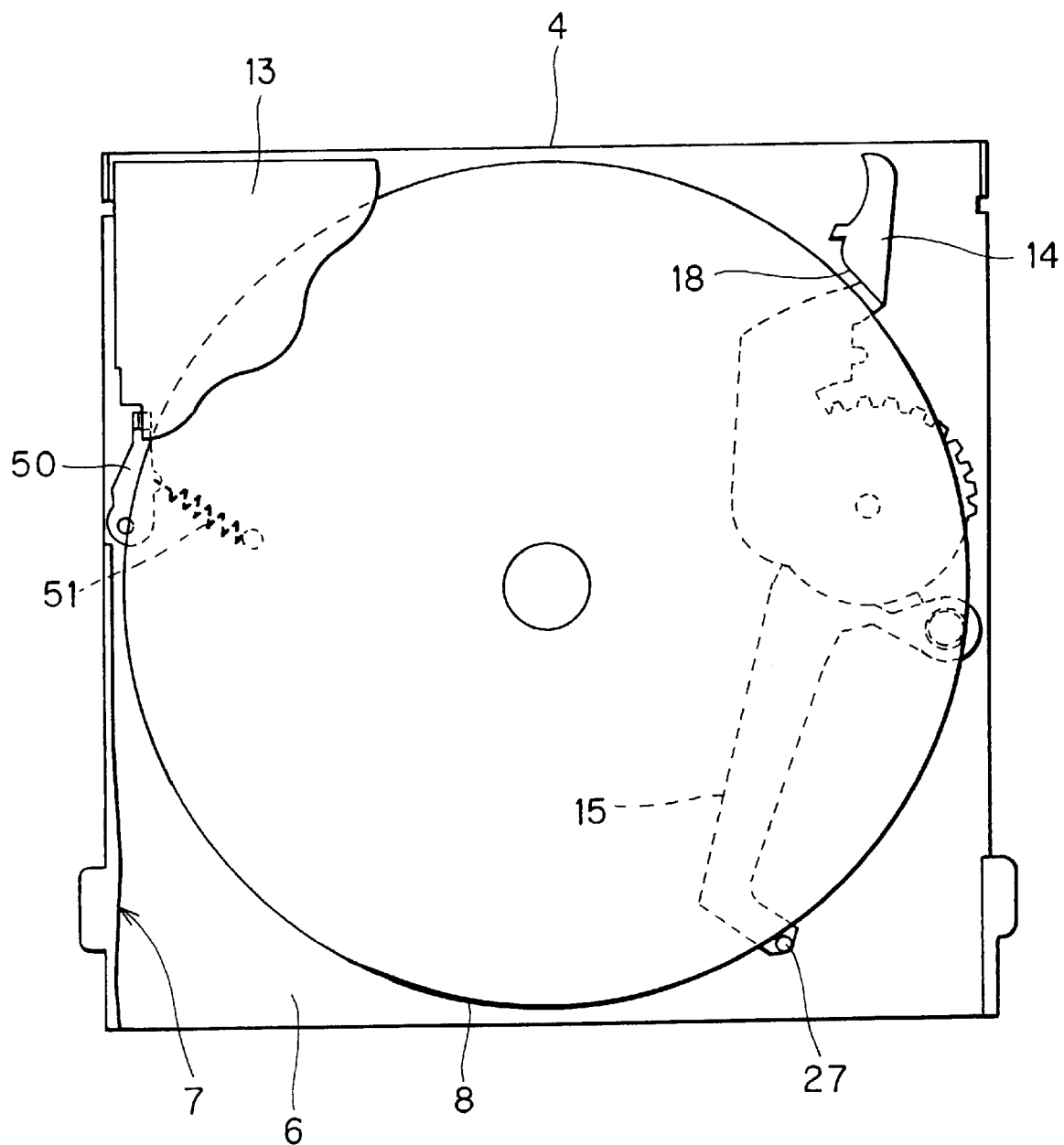
FIG. 13 is a plan view showing the relation between the first and second levers and the disk detecting member.
Figure 14:
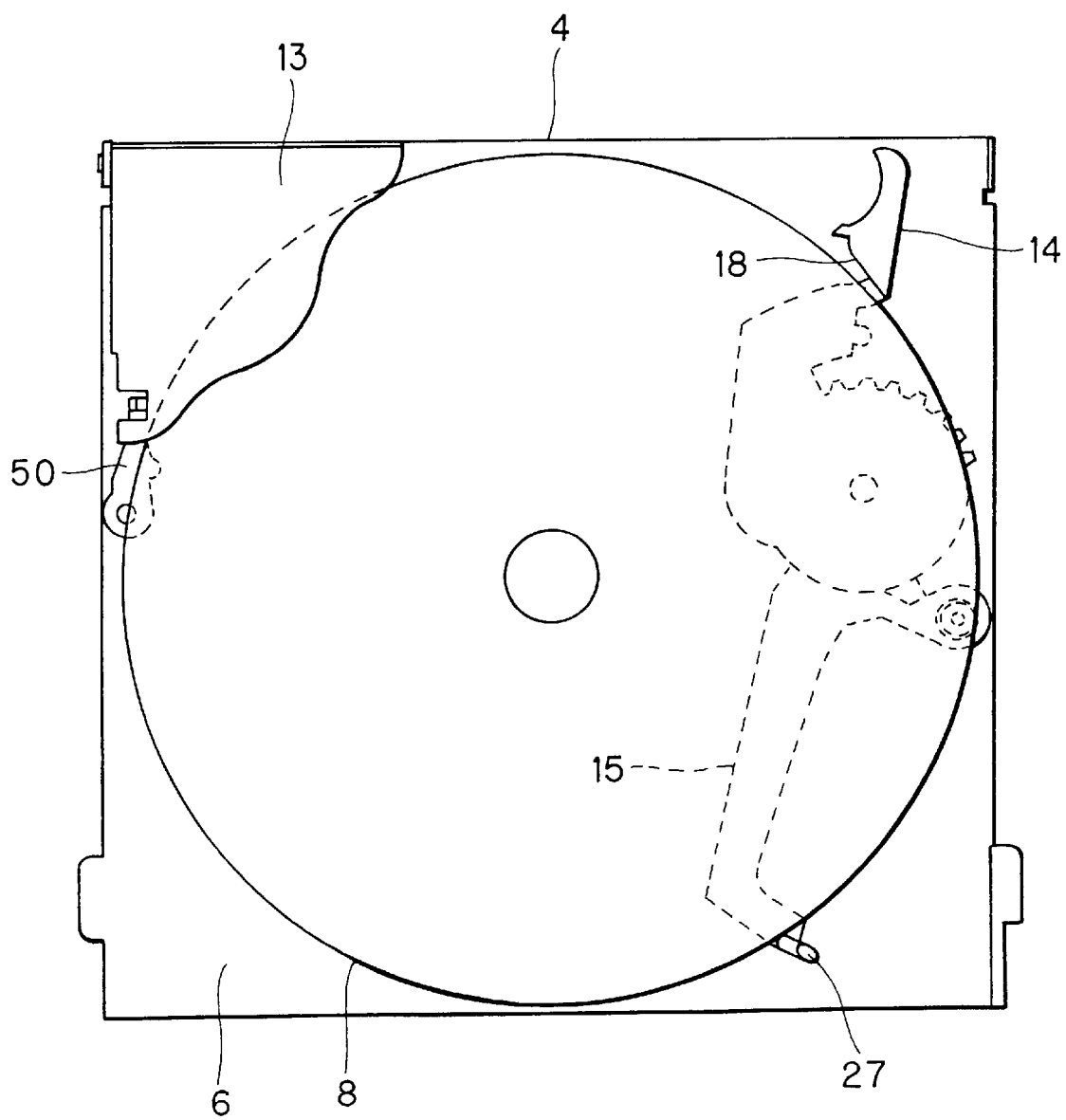
FIG. 14 is a plan view showing the relation between the first and second levers and the disk detecting member.

The chassis 4 further supports a disk detecting member 50 (see FIG. 12), which is horizontally rockably mounted and serves to detect correct loading of a disk at the disk playback position. FIG. 12 is a perspective view showing the relation between the disk detecting member 50 and the clamper support 13. As shown in FIG. 13, the disk detecting member 50 is biased horizontally in the clockwise direction by a spring 51, and normally it is prohibiting the descent of the clamper 12 with its free end in contact with the underside of the clamper support 13. However, when the disk 8 reaches the playback position as shown in FIG. 8, the disk detecting member 50 is pushed away by the edge of the disk 8 and rocked against the elastic force of the spring 51, as shown in FIG. 13, thus releasing the clamper 12 from the prohibition of the descent. As the clamper 13 is rocked downward, it causes further rocking movement of the disk detecting member 50 in the direction opposite to the biasing direction. The disk detecting member 50 is thus separated from the edge of the disk 8, as shown in FIG. 14.

As shown in FIG. 1, the chassis 4 further supports a lock lever 52 rockably mounted on its side surface. The lock lever 52 has a connecting pin 53 provided at one end and an engagement portion 54 formed at the other end. The clamper support 13 has a side wall having a horizontally elongate hole 55, in which the connecting pin 53 is engaged, and the player body 1 has an engaging recess 56. When the clamper support 13 is at an upper set position, the engaging portion 54 is in engagement in the engaging recess 56. In this state, the chassis 4 is secured to the player body 1, and the damping effect of the clamper 3 is suppressed. When the engaging portion 54 is detached from the engaging recess 56 with downward rocking movement of the clamper support 13, the damper 3 provides a damping effect and thus holds the chassis 4 in a floating state with respect to the player body 1.

The operation of the disk loading device having the above construction will now be described.

As shown in FIGS. 2 and 6, before the disk loading, the first lever 14 is in contact with the stopper pin 26a and is at the disk waiting position by receiving the elastic force of the lever biasing spring 30. Also, the second lever 15 is located slightly inside the width of the orbit or path traced by the disk 8 being inserted, with the cam engagement pin 28 in contact with the inner surface of the cam groove 22.

By inserting the disk 8 through the disk loading slot 6, the second lever 15 is rocked up to the phantom line position shown in FIG. 6 with its disk pushing member 27 pushed away by the edge of the disk 8. When the edge of the disk 8 is brought into contact with the large-size disk contact part 18 of the first lever 14, the disk 8 assumes a stable state that it is clamped from the opposite sides between the first contact part 7a of the disk guide 7 and the disk pushing member 27 of the second lever 15.

By further pushing the disk 8 against the elastic force of the lever biasing spring 30, the left edge of the disk 8 proceeds from the first contact part 7a to the slanted second contact part 7b, so that the disk 8 can now be pushed forth lightly. Also, the first lever 14 is rocked toward the retreated position with its large-size disk contact part 18 pushed by the disk 8. The elastic force of the lever biasing spring 30 eventually causes the second lever 15 to follow the first lever 14 and turn to push forth the disk 8 with the disk pushing member 27.

When the first lever 14 clears the "dead point" position shown in FIG. 7, the lever biasing spring 30 turns to bias the first lever 14 in the clockwise direction. In this state, the disk 8 may be released. At this time, the first lever 14 is quickly rocked clockwise by the elastic force of the lever biasing spring 30 until it is stopped at the position shown in FIG. 8 with its contact portion 26 brought into contact with the first lever control cam 43. The elastic force of the lever biasing spring 30 also causes the second lever 15 to follow the first lever 14, and the disk 8 is thus clamped from the front and rear sides by the first and second levers 14 and 15 and is transported in this state with its edge in frictional contact with the third contact part 7c up to the playback position shown in FIG. 8.

When the first lever 14 is rocked to the playback position shown in FIG. 8, the disk 8 has been separated from the disk guide 7. At this time, the disk detecting member 50 replaces 7 and is brought into contact with the edge or outer periphery of the disk 8 by the elastic force of the spring 51. The disk 8 is thus positioned on the turntable 19 with its edge supported at three, substantially uniformly spaced-apart points by the first and second levers 14 and 15 and the disk detecting member 50. FIG. 13 is a plan view showing the disk 8 positioned on the turntable 19 by the first and second levers 14 and 15 and the disk detecting member 50.

When the first lever 14 is rocked up to the position shown in FIG. 8, as shown in FIG. 10B, the intermediate lever 34 turns on the start switch 33 to start the loading motor 32. The rotation of the loading motor 32 is transmitted with speed reduction via the worm gear 35, the worm wheel 36 and the speed reduction gears 37 and 38 to the cam member 39.

The cam member 39 is thus rotated in the counterclockwise direction. As a result, the contact pin 49 is caused to proceed from the top surface of the cam member 39 into the clamper control cam 44 and is lowered as it proceeds therealong, thus lowering the clamper support 13. The clamper 12 is thus lowered to clamp the disk between it and the turntable 10. While the clamper support 13 is rocked downward, it separates the disk detecting member 50 from the edge of the disk 8, as shown in FIG. 14.

The rotation of the cam member 39 also causes rocking movement of the first lever 14 to the retreated position shown in FIG. 9 with the contact portion 26 brought from the outer periphery 43a of the first cam control lever 43 to the notch 43b. The cam engagement pin 28 is also displaced along the separating part 25 to cause slight counterclockwise rocking movement of the second lever 15, thus separating the disk pushing member 27 from the disk 8. FIG. 14 is a plan view showing the relation of the first and second levers 14 and 15 and the disk detecting member 50 to one another when the above preparations of playing back of the disk are completed.

At this time, the start switch 33 is turned off to stop the loading motor 32, and the turntable drive motor 9 is started to rotate the turntable 10. The pick-up 11 thus reads out data recorded on the disk 8. During the period from the start till the stop of the loading motor 32, the cam member 39 is rotated by about one half rotation, and the notched gear 42 approaches the intermediate gear 40.

Figure 15:
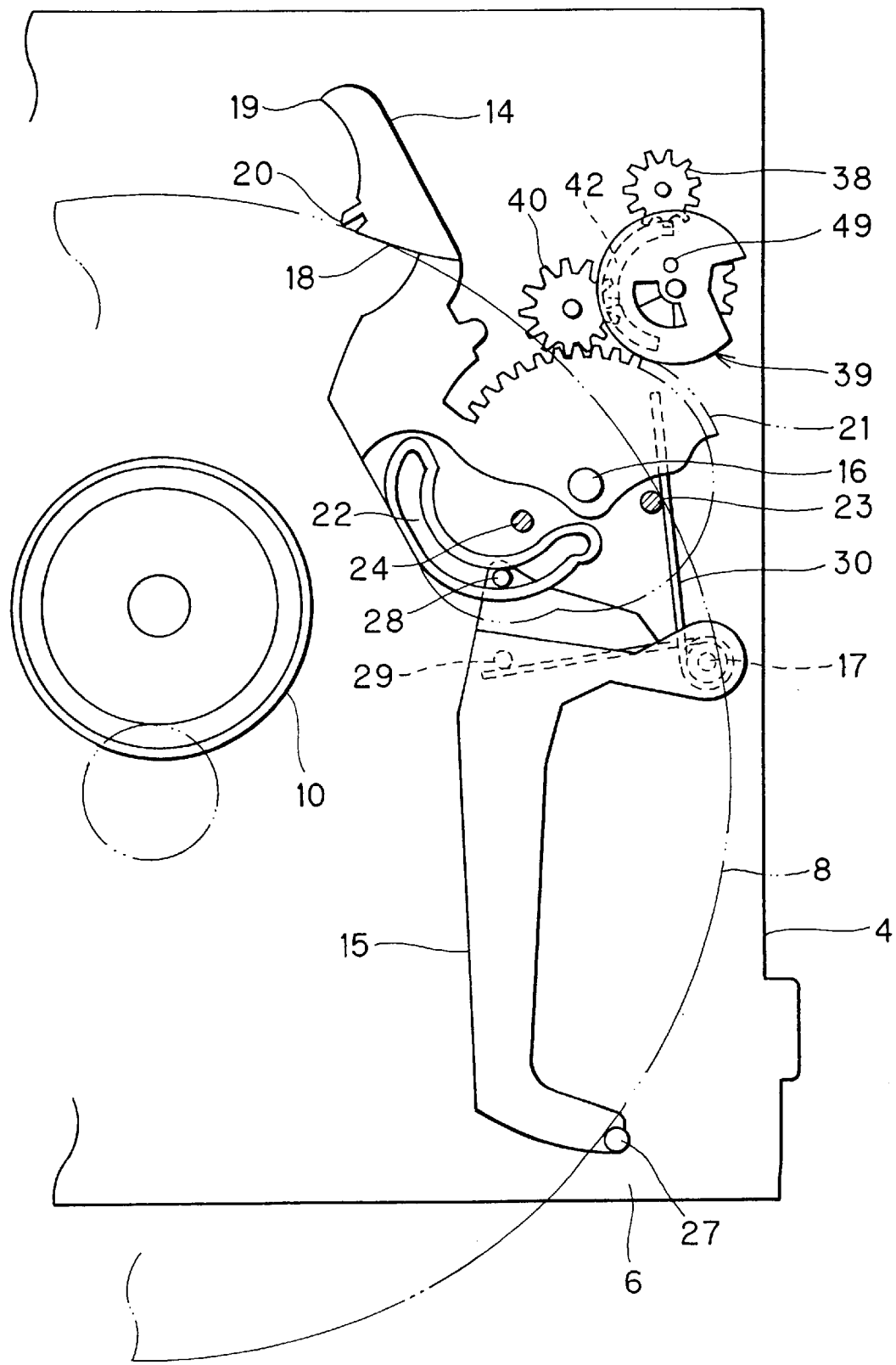
FIG. 15 is a plan view showing the disk player right after disk unloading operation.

When taking out the disk 8 after the playback operation, an ejecting operation is brought about to stop the turntable drive motor 9 and cause rotation of the loading motor 32 in the same direction as in the playback operation preparations by turning on an eject switch (not shown). The cam member 39 is thus rotated in the same direction to bring the outer periphery 43a of the first lever control cam 43 into contact with the contact portion 26 again and cause slight counterclockwise rocking movement of the first lever 14. Thus, the large-size disk contact part 18 is brought into contact with the edge of the disk 8. At the same time, the second lever 15 is rocked in the clockwise direction to bring the disk pushing member 27 into contact with the edge of the disk 8, as shown in FIG. 15. Subsequently, the contact pin 49 is pushed up from the clamper control cam 44 to the top surface of the cam member 39, thus raising the clamper 12. At this time, the disk detecting member 50 is brought to the underside of the clamper support 13 and into contact with the edge of the disk 8.

Eventually, the notched gear 42 is brought into mesh with the intermediate gear 40, and the first lever 14 is slowly rocked via the sector gear 21 up to the disk waiting position. Subsequently, the eject switch is turned off. The rocking movement of the first lever 14 causes displacement of the cam engagement pin 28 along the cam groove 22 from the minimum distance position to the maximum distance position, and the second lever 15 is thus restored to the initial position.

The rocking movement of the first lever 14 also causes the disk 8 to be pushed back by the large-size disk contact part 18 up to the phantom line position as shown in FIG. 6. While the disk 8 is pushed back by the first lever 14, its floating is prevented by the anti-floating part 20 of the first lever 14.

The disk 8 being pushed back by the first lever 14, is stopped at the phantom line position shown in FIG. 6 with its edge clamped between the first contact part 7a of the disk guide 7 and the disk pushing member 27 of the second lever 15. In a case when the disk suddenly flies out from, for instance, an automotive disk player at the time of its ejection, the driver may be in a dangerous situation that he or she should pick up the disk while driving the car. Such a dangerous situation can be evaded by clamping the disk 8 between the first contact part 7a and the disk pushing member 27. Since the disk 8 has been pushed back to such a position that about one half of it projects from the disk loading slot 6, it can be readily taken out.

In the above embodiment, when loading the disk the drive means 31 is started by the first lever 14 via the intermediate lever 34. However, it is also possible to arrange such that the drive means 31 is started by the second lever 15 interlocked to the first lever 14.

In addition, while the rocking centers of the first and second levers 14 and 15, i.e., the pins 16 and 17, are set inside the contour of the disk 8 at the playback position for reducing the planar size and overall size of the device, it is possible to freely select the positions of the pins 16 and 17, and also mount the two levers on a common pin.

As has been described in the foregoing, with the disk loading device according to the present invention, after the inserted disk 8 has been accurately positioned at the playback position by the first and second levers 14 and 15, the disk can be reliably clamped between the clamper 12 and the turntable 10 by causing the timing mechanism 39 to bring the clamper closer to the turntable.

In addition, since the disk is transported with the rockable first and second levers by utilizing the reversible action of the lever biasing means 30, it is possible to provide a small-size and simple construction, which is suited for automotive disk players as well.

Furthermore, with the arrangement that when a small-size disk d is inserted from the disk loading slot 6, the lever biasing means continuously biases the first lever toward the disk waiting position until the disk is fully concealed inside the disk loading slot, a small-size disk inserted by mistake can be pushed back by the first lever, and it is possible to ensure safety.

Moreover, with the second lever 15 set such that it is initially at a position inside the width of the orbit traced by the inserted disk 8, upon exceeding of the position of the inserted disk in contact with the second lever, the disk is pushed forth by the second lever. A sense that the disk is withdrawn thus can be obtained, and the mood of operation when loading the disk can be improved.

Yet further, by setting the rocking centers of the first and second levers 14 and 15 within the contour of the disk at the playback position, it is possible to reduce the planar size and overall size of the device.

What is claimed is:

1. A disk loading device for a disk player that completes preparation for playback of a disc by transporting the disk inserted into a disk loading slot on to a turntable and holding the disk on the turntable by lowering a clamper, comprising:
   a first lever rockably moved and reciprocable between a disk waiting position, at which the first lever is in contact with the edge of the disk at a position that the disk can be taken out, and a retreated position, at which the first lever is spaced apart from the disk during playback;
   a second lever rockably disposed on the same side of a disk loading path as the first lever such as to be capable of being in contact with the edge of the disk, the second lever being held, in an interlocked relation to the first lever, at an initial position in a zone permitting the insertion of the disk when the first lever is at the disk waiting position;

a disk guide for setting an orbit of transport of the disk in contact with the edge of the disk on the side of the disk loading path opposite the first and second levers;

lever biasing means for always biasing the second lever towards the disc and biasing the first lever away from a predetermined intermediate rocking position of unstable equilibrium of the first lever:

clamper biasing means for always biasing the clamper toward the turntable;

a timing mechanism for prohibiting the progress of the clamper toward the turntable and tentatively prohibiting the rocking movement of the first lever from a position, at which the first lever is in contact with the disk, to the retreated position;

separating means for separating the second lever from a position thereof in contact with the disk in an interlocked relation to the rocking movement of the first lever from the position in contact with the disk to the retreated position; and drive means including a motor as a drive source, for being started to operate the timing mechanism when the rocking movement of the first lever is prohibited by the timing mechanism;

said timing mechanism being operative to retreat the first lever from the disk after the clamper has been brought closer to the turntable.

2. The disk loading device for a disk player according to claim 1, wherein when a small-size disk is inserted into the disk loading slot, the first lever is continuously biased by the lever biasing means toward the disk waiting position until the disk is fully concealed inside the disk loading slot.

3. The disk loading device for a disk player according to claim 1, wherein while the first lever is at the disk waiting position, the second lever is on the disk loading path.

4. The disk loading device for a disk player according to claim 1, wherein when loading the disk, the first lever starts the drive means.

5. The disk loading device for a disk player according to claim 1, wherein the lever biasing means is constituted by a single spring.

6. The disk loading device for a disk player according to claim 1, wherein the rocking centers of the first and second levers are set within the contour of the disk during playback.

* * * * *